US006350496B1

(12) United States Patent
Haftvani et al.

(10) Patent No.: US 6,350,496 B1
(45) Date of Patent: Feb. 26, 2002

(54) METHOD FOR PRODUCING PERMANENT DRAWINGS AND MARKINGS ON PLASTIC TILES OR TILES MADE OF POLYCARBONATE

(75) Inventors: Razmik Haftvani, La Canada; John A. Hewitson, Woodland Hills, both of CA (US)

(73) Assignee: Ronan Engineering Company, Woodland Hills, CA (US)

( * ) Notice: Subject to any disclaimer, the term of this patent is extended or adjusted under 35 U.S.C. 154(b) by 0 days.

(21) Appl. No.: 09/687,982

(22) Filed: Oct. 13, 2000

(51) Int. Cl.[7] .................................................. C08J 7/04

(52) U.S. Cl. ......................... 427/511; 156/63; 427/256; 427/385.5; 427/421; 427/558; 427/559; 427/595

(58) Field of Search ............................ 156/63; 427/511, 427/256, 385.5, 421, 558, 559, 595

(56) References Cited

U.S. PATENT DOCUMENTS

| | | | |
|---|---|---|---|
| 4,169,907 | A | 10/1979 | Barker et al. |
| 4,233,343 | A | 11/1980 | Barker et al. |
| 4,318,952 | A | 3/1982 | Barker et al. |
| 4,339,489 | A | 7/1982 | Barker et al. |
| 4,393,108 | A | 7/1983 | Barker et al. |
| 4,613,525 | A | 9/1986 | Miyamoto et al. |
| 4,857,386 | A | 8/1989 | Butters et al. |
| 4,868,581 | A | 9/1989 | Mouri et al. |
| 4,902,577 | A | 2/1990 | Butters et al. |
| 5,006,172 | A | 4/1991 | Chieng et al. |
| 5,113,200 | A | 5/1992 | Deguchi et al. |
| 5,312,654 | A | 5/1994 | Arimatsu et al. |
| 5,407,474 | A | 4/1995 | Airey et al. |
| 5,605,750 | A | 2/1997 | Romano et al. |
| 5,609,993 | A | 3/1997 | Hase et al. |
| 5,672,413 | A | 9/1997 | Taylor et al. |
| 5,718,793 | A | 2/1998 | Inamoto et al. |
| 5,786,835 | A | 7/1998 | Ikeda et al. |
| 5,795,425 | A | 8/1998 | Brault et al. |
| 5,837,375 | A | 11/1998 | Brault et al. |
| 5,858,514 | A | 1/1999 | Bowers |
| 5,916,662 | A | 6/1999 | Schmidt |
| 6,000,793 | A | 12/1999 | Inamoto |
| 6,001,482 | A | 12/1999 | Anderson et al. |
| 6,025,022 | A | 2/2000 | Matzinger |

*Primary Examiner*—Bernard Pianalto
(74) *Attorney, Agent, or Firm*—Thomas I. Rozsa; Tony D. Chen; Jerry Fong

(57) ABSTRACT

A method of making permanent drawings and markings on a mosaic tile having a grid frame with a plurality of replaceable plastic tiles or tiles made of polycarbonate material. The method comprises the steps of providing a plurality of separate and replaceable tiles on a grid frame of the mosaic tile; providing an ink-jet printer having an ultraviolet stable ink; spraying the ultraviolet stable ink out from the ink-jet printer onto the plurality of replaceable tiles of the mosaic tile to form an image, and exposing an ultraviolet light on the image to cure the ultraviolet stable ink onto the plurality of replaceable tiles of the mosaic tile. The method further comprises the step of replacing an old tile with a new tile having the same marking or new markings as the old file. The method causes the ink to be embedded onto the files and remain in a very permanent state.

9 Claims, 2 Drawing Sheets

METHOD FOR PRODUCING PERMANENT DRAWINGS AND MARKINGS ON PLASTIC TILES OR TILES MADE OF POLYCARBONATE

BACKGROUND OF THE INVENTION

1. Field of the Invention

The present invention relates generally to methods for making permanent drawings and markings on tiles. More particularly, the present invention relates a method for making permanent drawings and markings on a mosaic arrangement.

2. Description of the Prior Art

Specifically, in the past tiles have either been painted by a laborious hand process or alternatively, a scratch or etching was made in the tiles and then followed with a painting process over the etching to cause the paint to be embedded on the surface of the tiles.

The following twenty-five (25) prior art patents are found to be pertinent to the field of the present invention:

1. U.S. Pat. No. 4,169,907 issued to Barker et al. on Oct. 2, 1979 for "Simulated Ceramic Tile" (hereafter "the '907 Barker Paten");
2. U.S. Pat. No. 4,233,343 issued to Barker el at. on Nov. 11, 1980 for "Three-Dimensional Decorative Surface" (hereafter "the '343 Barker Patent");
3. U.S. Pat. No. 4,318,952 issued to Barker et al. on Mar. 9, 1982 for "Three-Dimensional Decorative Surface" (hereafter "the '952 Barker Patent");
4. U.S. Pat. No. 4,339,489 issued to Barker et al. on Jul. 13, 1982 for "Simulated Ceramic Tile" (hereafter "the '489 Barker Patent");
5. U.S. Pat. No. 4,393,108 issued to Barker et al. on Jul. 12, 1983 for "Simulated Ceramic Tile" (hereafter "the '108 Barker Patent");
6. U.S. Pat. No. 4,613,525 issued to Miyamoto et al. on Sep. 23, 1986 for "Ink-Jet Recording Medium" (hereafter the "Miyamoto Patent");
7. U.S. Pat. No. 4,857,386 issued to Butters et al. on Aug. 15, 1989 for "Inkable Sheet" (hereafter "the '386 Butters Patent");
8. U.S. Pat. No. 4,868,581 issued to Mouri et al. on Sep. 19, 1989 for "Ink-Receiving Composite Polymer Material" (hereafter the "Mouri Patent");
9. U.S. Pat. No. 4,902,577 issued to Butters et al. on Feb. 20, 1990 for "Inkable Sheet" (hereafter "the '577 Butters Patent");
10. U.S. Pat. No. 5,006,172 issued to Chieng et al. on Apr. 9, 1991 for "Ink-Jet Inks For The Marking Of Plastics" (hereafter the "Chieng Patent");
11. U.S. Pat. No. 5,113,200 issued to Deguchi et al. on May 12, 1992 for "Hot Melt Ink Jet Apparatus Having Intervention Member Located Between Member And A Printed Printing Sheet" (hereafter the "Deguchi Patent");
12. U.S. Pat. No. 5,312,654 issued to Arimatsu et al. on May 17, 1994 for "Method For Directly Making Printing Plate Using Ink-Jet System" (hereafter the "Arimatsu Patent");
13. U.S. Pat. No. 5,407,474 issued to Airey et al. on Apr. 18, 1995 for "Ink Jet Printer Ink For Printing On Ceramics Or Glass" (hereafter the "Airey Patent");
14. U.S. Pat. No. 5,605,750 issued to Romano et al. on Feb. 25, 1997 for "Microporous Ink-Jet Recording Elements" (hereafter the "Romano Patent");

15. U.S. Pat. No. 5,609,993 issued to Hase et al. on Mar. 11, 1997 for "Process For Producing Lithographic Printing Plate, Photosensitive Plate And Aqueous Ink Composition Therefor" (hereafter the "Hase Patent");
16. U.S. Pat. No. 5,672,413 issued to Taylor et al. on Sep. 30, 1997 for "Element And Associated Process For Use With Ink Jet Hot Melt Inks For Thermal Image Transfer" (hereafter the "Taylor Patent");
17. U.S. Pat. No. 5,718,793 issued to Inamoto et al. on Feb. 17, 1998 for "image forming process and printed article" (hereafter "the '8793 Inamoto Patent");
18. U.S. Pat. No. 5,786,835 issued to Ikeda et al. on Jul. 28, 1998 for "Image Forming Method, Process For Producing Decorative Aluminum Plate, Apparatus For Carrying Out The Process, Decorative Aluminum Plate And Recording Medium" (hereafter the "Ikeda Patent");
19. U.S. Pat. No. 5,795,425 issued to Brault et al. on Aug. 18, 1998 for "Ink Jet Imaging Process And Recording Element For Use Therein" (hereafter "the '425 Brault Patent");
20. U.S. Pat. No. 5,837,375 issued to Brault et al. on Nov. 17, 1998 for "Ink Jet Imaging Process And Recording Element For Use Therein" (hereafter "the '375 Brault Patent");
21. U.S. Pat. No. 5,858,514 issued to Bowers on Jan. 12, 1999 for "Coatings For Vinyl And Canvas Particularly Permitting Ink-Jet Printing" (hereafter the "Bowers Patent");
22. U.S. Pat. No. 5,916,662 issued to Schmidt on Jun. 29, 1999 for "Decorative Tile And Decorative Printing Thereof" (hereafter the "Schmidt Patent);
23. U.S. Pat. No. 6,000,793 issued to Inamoto on Dec. 14, 1999 for "Image Forming Process And Printed Article" (hereafter "the '0793 Inamoto Patent");
24. U.S. Pat. No. 6,001,482 issued to Anderson et al. on Dec. 14, 1999 for "Ink Jet Receptor Element Having A Protective Layer" (hereafter the "Anderson Patent"); and
25. U.S. Pat. No. 6,025,022 issued to Matzinger on Feb. 15, 2000 for "Two-Component Ink Jet Ink Method For The Production Of Lithographic Plates" (hereafter the "Matzinger Patent").

The '907 Barker Patent discloses a simulated ceramic tile which comprises a nonmetallic, porous substrate having a flat surface coated with an undercoat effective to seal the surface and provide a colored, printable base. An ink layer comprises a layer of colored ink lines of a silicone-containing drying ink which forms a printed pattern on the printable base where the printed pattern is clearly visible. A coloring pigment-containing liquid top coat of a hard resinous silicone-free, film-forming material is applied to the printed pattern on the printable base where the silicone is allowed to repel the liquid to form ridges of the liquid adjacent to the printed pattern. The substrate is dried and baked to fix the liquid material as a hard, coloring pigment-containing, resinous top coat defining a contour of valleys, hills and plains, wherein the intensity of color in the top coat varies with the variation in the contour.

The '343 Barker Patent discloses a three-dimensional decorative surface which is formed employing the different surface tension properties of a wet ink printed pattern and a liquid top coat composition. The difference in surface tension is such that the liquid top coat composition retracts from the wet ink pattern and subsequently the ink is dried and the top coat is dried and cured.

The '952 Barker Patent discloses a three-dimensional decorative surface that is similar to the '343 Barker Patent.

The '489 Barker Patent discloses a simulated ceramic tile that is similar to the '907 Barker Patent.

The '108 Barker Patent discloses a simulated ceramic tile that is similar to the '489 and '907 Barker Patents.

The Miyamoto Patent discloses an ink-jet recording system which contains a hydrotalcite compound. The recording system provides recorded images in waterproofness and light fastness by jetting a water-base ink containing a water soluble dye.

The '386 Butters Patent discloses an inkable sheet. It comprises a PET film base sheet which has a surface with an ink-absorbent resin layer which contains a vinyl pyrrolidone polymer and an acrylic or methacrylic polymer.

The Mouri Patent discloses an ink-receiving composite polymer material. It comprises a nonvolatile organic compound which is caused to penetrate into and diffuse through an ink-receiving polymer forming from any one surface side. A recording medium is used for ink-jet recording wherein a nonvolatile organic compound is caused to penetrate into and diffuse through an ink-receiving layer from the surface.

The '577 Butters Patent discloses an inkable sheet that is similar to the '386 Butters Patent.

The Chieng Patent discloses ink-jet inks for the marking of plastics. The inks are formulated by replacing all or a large percentage of the aqueous component in prior art links with an organic liquid which can adhere to, dissolve, swell, or penetrate a plastic film and also act as a solvent for the dyestuff in the ink.

The Deguchi Patent discloses a hot melt ink jet apparatus which heats a solid ink into a molten state and then ejects the molten ink toward a printing sheet. When printing is performed on the printing sheet, the ink which is ejected onto the printing sheet quickly solidifies.

The Arimatsu Patent discloses a method for directly making printing plates using an ink-jet system. The method includes forming an image on a substrate having an ink absorbing layer for lithographic plates by an ink-jet printing using a photopolymerizable ink composition. The ink is exposed to an active light in the wavelength region with which said ink composition is sensitized to cure the image.

The Airey Patent discloses an ink-jet printer ink for printing on ceramic or glass. The pigmented ink is usable in an ink-jet printer in which the maximum particle size of the pigment is sufficiently small not to block the nozzles or the filters of the printer. The particle size range is sufficiently narrow for the ink to have a low viscosity for the printer to operate.

The Romano Patent discloses a microporous ink-jet recording element for an ink-jet printer which comprises an opaque substrate.

The Hase Patent discloses a process for producing a lithographic printing plate, a photosensitive plate and aqueous ink composition therefor.

The Taylor Patent discloses an element and associated process for use with ink-jet hot melt inks for thermal image transfer. The element serves to accept the hot melt ink image from an ink-jet printer and to transfer the image together with a protective layer onto a difficult image substrate. It utilizes temperatures of 65° C. and 85° C.

The '8793 Inamoto Patent discloses an image forming process and printed article.

The Ikeda Patent discloses an image forming method and process for producing a decorative aluminum plate. The Ikeda Patent further discloses an apparatus which includes a decorative aluminum plate and a recording medium for carrying out the process.

The '425 Brault Patent discloses an ink-jet imaging process and recording element for use therein for use on large format posters, billboards and the like.

The '375 Brault Patent discloses an ink-jet imaging process and recording element for use therein that is similar to the '425 Brault Patent.

The Bowers Patent discloses a coating for vinyl and canvas particularly permitting ink-jet printing.

The Schmidt Patent discloses a decorative tile and decorative printing thereof. The decorative tile is made of molded hard urethane foam. The surface of the tile is decorated in an automated fashion, by printing a clear sheeting with an electrostatic ink in a color laser printer, and then compressing the sheeting against the tile surface in a high temperature press to heat transfer the sheeting to the surface of the tile.

The '0783 Inamoto Patent discloses an image forming process and printed article.

The Anderson Patent discloses an ink-jet receptor element having a protective coating. The protective coating is a single protective layer that contains a fluoropolymer and an acrylic polymer.

The Matzinger Patent discloses a two-component ink-jet ink method for the production of lithographic plates.

It is desirable to provide a method for making permanent drawings and markings on a mosaic tile. It is also desirable to provide a method for making permanent drawings and markings on a mosaic tile, where a damaged portion of the entire tile can be replaced with a new tile having the same markings as the damaged portion of the tile, thereby eliminating the need to replace the entire mosaic tile.

SUMMARY OF THE INVENTION

The present invention is a method of making permanent drawings and markings on a mosaic tile having a grid frame with a plurality of replaceable plastic tiles or tiles made of polycarbonate material thereon.

The method comprises the steps of providing a plurality of separate and replaceable tiles on a grid frame of the mosaic tile; providing an ink-jet printer having an ultraviolet stable ink; spraying the ultraviolet stable ink out from the ink-jet printer onto the plurality of replaceable tiles of the mosaic tile to form an image; and exposing an ultraviolet light on the image to cure the ultraviolet stable ink onto the plurality of replaceable tiles of the mosaic tile.

The method further comprises the step of replacing a damaged tile within the mosaic with a new tile having the same marking as the damaged tile. The method causes the ink to be embedded onto the tiles and remain in a very permanent state. The benefit of the method of having the ink-jet printer printing on the tiles is that it makes it much more efficient and farther, the ink itself is affixed in such a manner that it does not readily fade.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
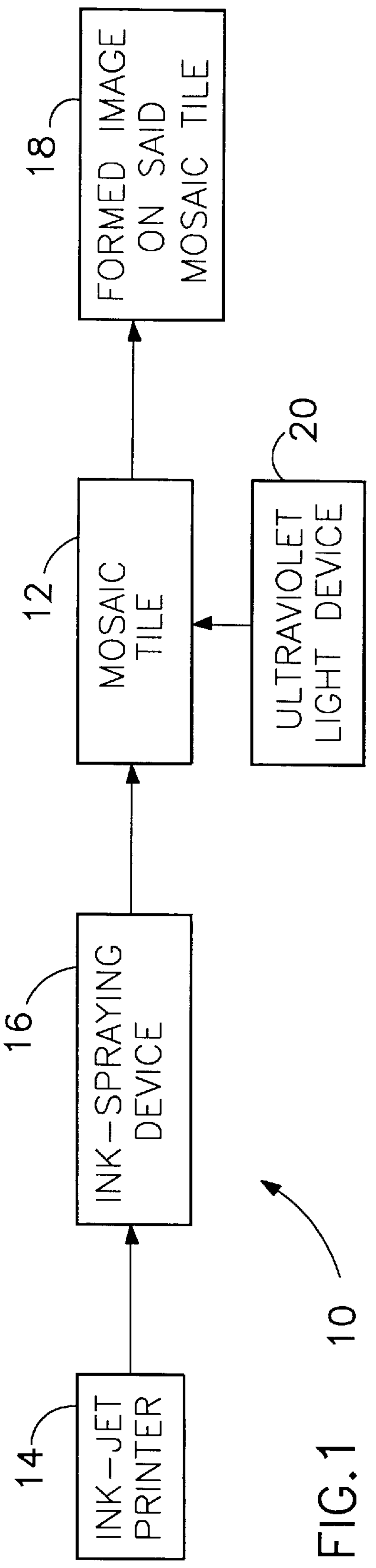
FIG. 1 is a simplified block diagram of a method for making permanent drawings and markings on a mosaic tile according to the present invention.

Referring to FIG. 1, there is shown a simplified block diagram of the present invention method 10 for making permanent drawings and markings on a mosaic tile 12. The method 10 comprises the steps of utilizing an ink-jet printer 14 with ultraviolet stable ink The ultraviolet stable ink is sprayed onto the mosaic tile 12 by a spraying device 16 located within the ink-jet printer 14 to form an image 18 such as permanent drawings and markings. An ultraviolet light device 20 exposes an ultraviolet light onto the image 18 to cure the ultraviolet stable ink onto the mosaic tile 12 to make the image permanent.

Figure 2:
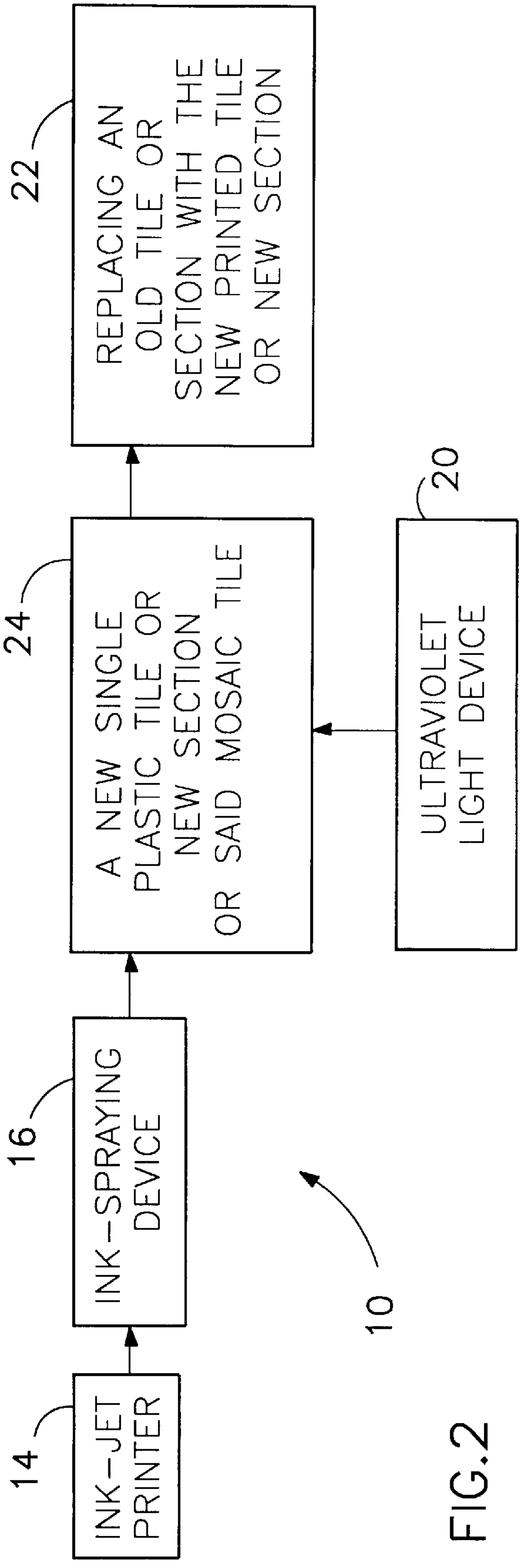
FIG. 2 is a simplified block diagram of a method for replacing an old tile or section with a new tile or section on the mosaic tile according to the present invention.

Referring to FIG. 2, there is shown a further simplified block diagram of the method according to the present invention, wherein the method further comprises the steps of replacing an old tile, tiles or section 22 of the mosaic tile 12 with a new tile, tiles or section 24 having the same markings or new markings thereon. The method 10 further utilizes the ink-jet printer 14 with ultraviolet stable ink. The ultraviolet stable ink is sprayed onto the new single tile or new section 24 of the mosaic tile 12 by a spraying device 16 located within the ink-jet printer 14 to form a partial image associated with the surrounding area of the mosaic tile 12. The ultraviolet light device 20 exposes an ultraviolet light onto the partial image to cure the ultraviolet stable ink onto the new tile or new section of the mosaic tile 12 to make the image permanent.

Figure 3:
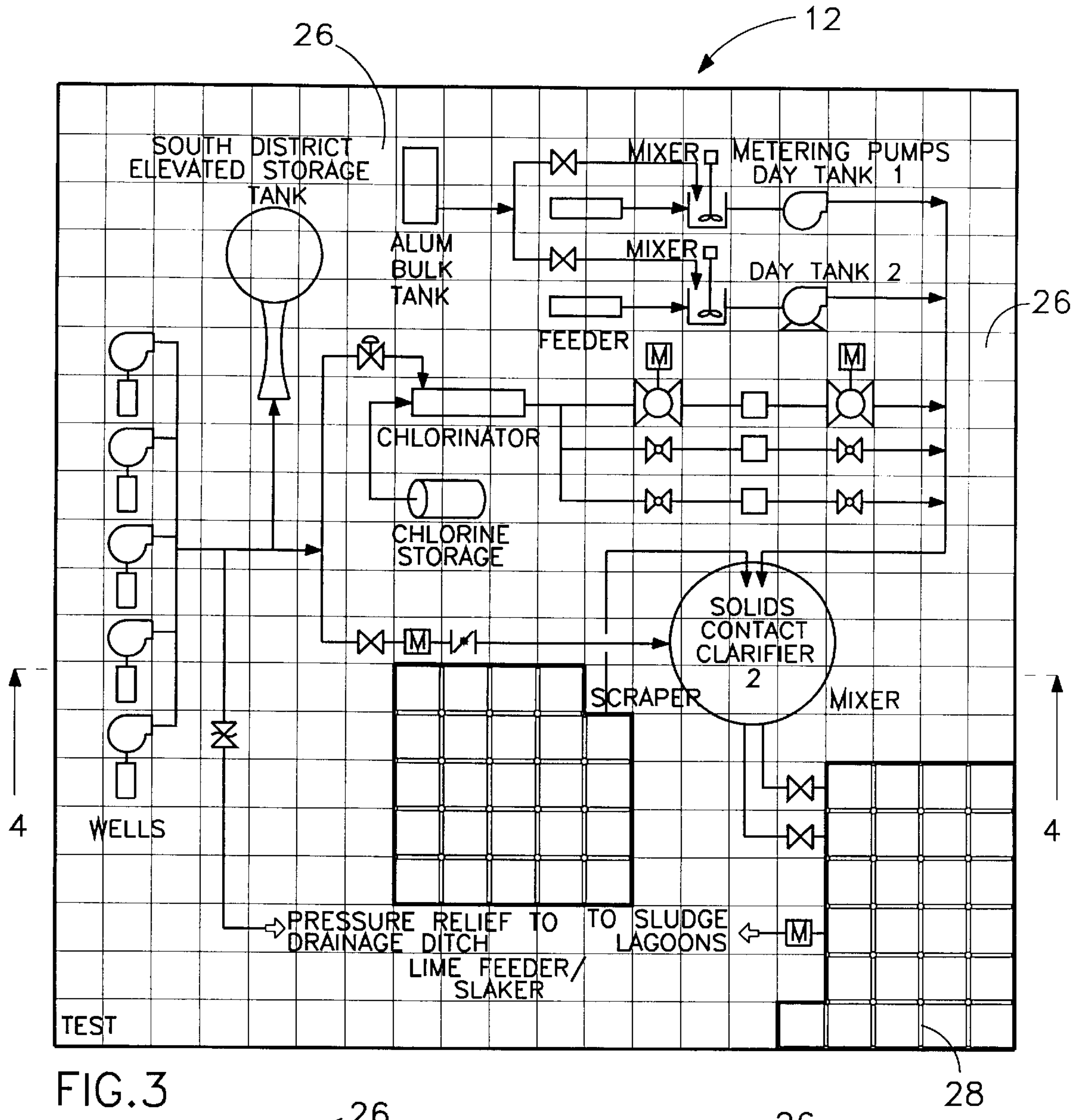
FIG. 3 is a top plan view of a mosaic tile according to the present invention.
Figure 4:
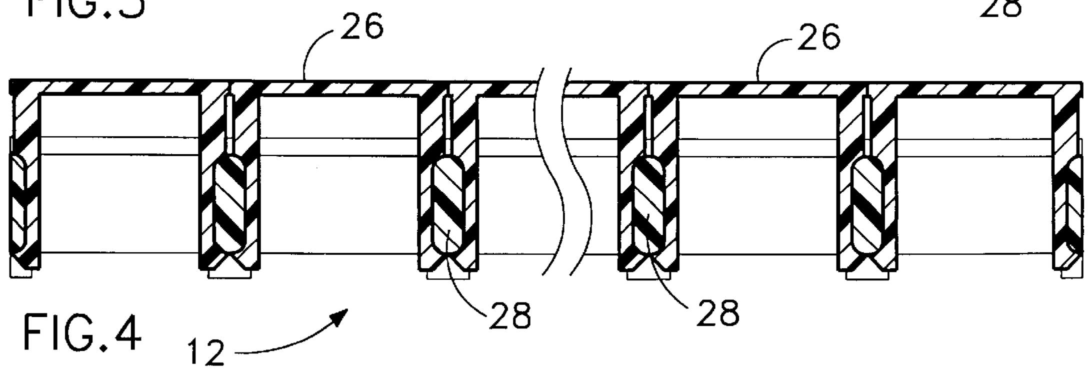
FIG. 4 is an enlarged cross-sectional view taken along line 4—4 of FIG. 3.

Referring to FIGS. 3 and 4, there is shown at 12 the mosaic tile which comprises a plurality of separate and replaceable tiles 26 press-fitted on a grid frame 28 of the mosaic tile 12. These tiles 26 are generally square shapes. The mosaic tile 12 represents a graphic system which provides means to display a layout and annunciate the status and measurement parameters of industrial process, security and fire alarms of buildings and manufacturing facilities, power distribution networks, and other operations. The mosaic tile graphic system is ideally suited where applications require frequent modifications due to plant expansion or process changes. The surface of the mosaic tile graphic system is printed with the ultraviolet stable ink and forms a customized layout depicting the process or facilities. The graphic layout may include light indicators, lamp or LED type, selector switches, pushbuttons, digital or analog readouts, annunciators, lamp cabinets, time clocks, or other electrical/electronic equipment required to display parameters and status. The grid frame and tile construction allows highest flexibility in regard to overall sizing, modification of display layout and addition or omission of indicators, control devices, and equipment without the use of special tools or training.

The present invention conforms to conventional forms of manufacture or any other conventional way known to one skilled in the art, and is of simple construction and is easy to use. The mosaic tile 12 can be made from several materials. The manufacturing process which could accommodate the construction of the mosaic tile may be injection, thermoform, etc. or other molding process. By way of example, the mosaic tile 12 can be made of plastic material or polycarbonate material. By way of example, the overall size of the mosaic tile 12 is approximately 48 inches by 96 inches. The tile can be laid on a table with the head of the ink-jet printer running over the tile to create the artwork pattern on the tile 12. By having the entire mosaic tile 12 rest on the table, the ink-jet printer can quickly spray the desired pattern onto the tile since the ink-jet printer can be preprogrammed to create the pattern. This process also allows the user to design on a mosaic tile 12 depicted in FIG. 3 when electrical components and devices are inserted behind and through the mosaic tile 12. If a small portion of the mosaic tile 12 needs to be replaced, the individual tiles 26 to be replaced are removed from the grid frame 28 and replaced with new tiles into which the desired graphic was printed with the ink-jet printer. After the printing is performed, the ink is exposed to an ultraviolet light which also shines over the tile as it lays flat on the table. The entire process can take only a few moments whereas prior art processes could take hours to achieve the same result. The individual tiles 26 can be made of plastic, polycarbonate or similar materials.

Defined in detail, the present invention is a method for producing a drawing and markings on a mosaic tile, the method comprising the steps of: (a) providing a plurality of separate and replaceable tiles press-fitted on a grid frame of the mosaic tile; (b) providing an ink-printer having ultraviolet stable ink; (c) spraying the ultraviolet stable ink out from the ink-jet printer onto the plurality of replaceable tiles of the mosaic tile to form the drawing or markings; and (d) exposing an ultraviolet light on the drawing or markings to cure the ultraviolet stable ink onto the plurality of replaceable tiles of the mosaic tile.

Defined broadly, the present invention is a method for producing an image on a mosaic tile, the method comprising the steps of: (a) providing a plurality of tiles of the mosaic tile; (b) providing an ink-jet printer having ink; (c) spraying the ink out from the ink-jet printer onto the plurality of tiles of the mosaic tile to form the image; and (d) exposing an ultraviolet light on the image to cure the ink onto the plurality of tiles of the mosaic tile.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A method for producing a drawing and markings on a mosaic tile, the method comprising the steps of:

a. providing a plurality of separate and replaceable tiles press-fitted on a grid frame of said mosaic tile;

b. providing an ink-jet printer having ultraviolet stable ink;

c. spraying said ultraviolet stable ink out from said ink-jet printer onto said plurality of replaceable tiles of said mosaic tile to form said drawing or markings; and d. exposing an ultraviolet light on said drawing or markings to cure said ultraviolet stable ink onto said plurality of replaceable tiles of said mosaic tile.

2. The method in accordance with claim 1, further comprising the steps of:

a. spraying said ultraviolet stable ink out from said ink-jet printer onto a new replaceable tile to form new markings or the same markings as an old replaceable tile;

b. exposing said ultraviolet light on said new markings or the same markings to cure said ultraviolet stable ink onto said new replaceable tile; and c. replacing said old replaceable tile with said new replaceable tile having said new markings or the same markings.

3. The method in accordance with claim 1, wherein said each replaceable tile is made out of plastic material.

4. The method in accordance with claim 1, wherein said each replaceable tile is made out of polycarbonate material.

5. A method for producing an image on a mosaic tile, the method comprising the steps of:

a. providing a plurality of tiles of said mosaic tile;

b. providing an ink-jet printer having ink;

c. spraying said ink out from said ink-jet printer onto said plurality of tiles of said mosaic tile to form said image; and d. exposing an ultraviolet light on said image to cure said ink onto said plurality of tiles of said mosaic tile.

6. The method in accordance with claim 5, further comprising the steps of:

a. spraying said ink out from said ink-jet printer onto a new tile to form a new partial image which matches said image and replaces an old partial image on an old tile;

b. exposing said ultraviolet light on said new partial image to cure said ink onto said new tile; and c. replacing said old tile with said new tile having said new partial image.

7. The method in accordance with claim 5, wherein said each tile is made out of plastic material.

8. The method in accordance with claim 5, wherein said each tile is made out of polycarbonate material.

9. The method in accordance with claim 5, wherein said plurality of tiles are replaceable.

* * * * *